(12) United States Patent
Leingang et al.

(10) Patent No.: US 7,014,038 B2
(45) Date of Patent: Mar. 21, 2006

(54) CARGO POWER DRIVE UNIT

(75) Inventors: Alan F. Leingang, Trabuco Canyon, CA (US); Matthew S. McConnell, Brea, CA (US); Robert M. Wolfe, Mission Viejo, CA (US)

(73) Assignee: Ancra International, LLC, Anaheim, CA (US)

( * ) Notice: Subject to any disclaimer, the term of this patent is extended or adjusted under 35 U.S.C. 154(b) by 0 days.

(21) Appl. No.: 10/473,164

(22) PCT Filed: Mar. 28, 2002

(86) PCT No.: PCT/US02/09476

§ 371 (c)(1),
(2), (4) Date: Mar. 15, 2004

(87) PCT Pub. No.: WO02/079071

PCT Pub. Date: Oct. 10, 2002

(65) Prior Publication Data

US 2004/0144622 A1    Jul. 29, 2004

Related U.S. Application Data

(60) Provisional application No. 60/279,414, filed on Mar. 29, 2001.

(51) Int. Cl.
*B65G 13/02* (2006.01)
(52) U.S. Cl. ..................... 198/782; 198/788; 198/789
(58) Field of Classification Search ............... 198/782, 198/788, 789
See application file for complete search history.

(56) References Cited

U.S. PATENT DOCUMENTS

| 3,709,450 A | 1/1973 | Watts et al. |
|---|---|---|
| 3,978,975 A | 9/1976 | Herbes et al. |
| 4,589,542 A | 5/1986 | Steadman |
| 5,042,645 A | 8/1991 | Pritchard |
| 5,131,527 A | 7/1992 | Humber |
| 5,183,150 A | 2/1993 | Chary et al. |
| 5,547,069 A | 8/1996 | Pritchard |
| 5,803,234 A | 9/1998 | Podkanski et al. |
| 5,938,003 A * | 8/1999 | Huber et al. ................. 198/782 |
| 6,135,269 A * | 10/2000 | Huber et al. ................. 198/782 |
| 6,279,730 B1 | 8/2001 | Schreger et al. |
| 6,340,085 B1 * | 1/2002 | Huber et al. ................. 198/782 |

FOREIGN PATENT DOCUMENTS

| DE | 3911214 A1 | 10/1990 |
|---|---|---|
| DE | 3942381 C1 | 1/1991 |
| DE | 69107605 T2 | 11/1991 |
| DE | 4136972 A1 | 5/1993 |
| DE | 4427696 A1 | 2/1996 |
| DE | 19608236 C1 | 3/1996 |
| DE | 19807229 A1 | 9/1999 |

(Continued)

*Primary Examiner*—James R. Bidwell
(74) *Attorney, Agent, or Firm*—McDermott Will & Emery LLP

(57) ABSTRACT

An apparatus (100) for conveying cargo is provided, comprising a support base (105) and drive assembly (110) pivotably mounted to the support base (105) for vertical movement. The drive assembly (110) comprises a roller (120) and a first electronically controlled motor (125) for rotation the roller (120). A life assembly has a second electronically controlled motor (155) for moving the drive assembly (110) relative to the support base (105) from a retracted position to an extended position with the roller (120) in driving abutment against the cargo. An electronic controller (195) controls the first (125) and second (155) motors.

46 Claims, 7 Drawing Sheets

FOREIGN PATENT DOCUMENTS

| | | |
|---|---|---|
| DE | 19807230 A1 | 9/1999 |
| EP | 0481587 B1 | 4/1992 |
| EP | 0512672 B1 | 11/1992 |
| EP | 0952096 | 10/1999 |
| GB | 2 291 848 A | 2/1996 |

* cited by examiner

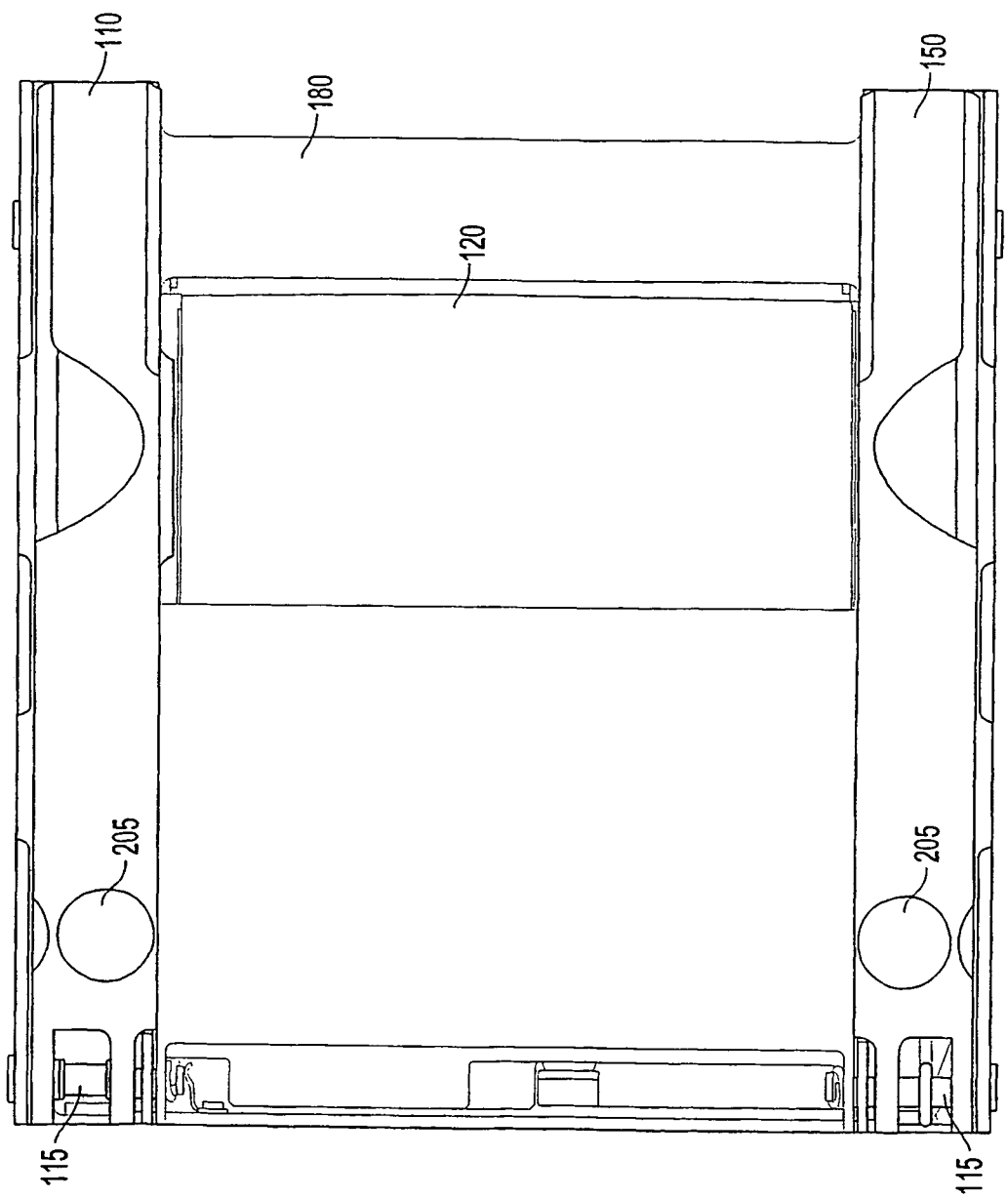

CARGO POWER DRIVE UNIT

This application claims the benefit of Ser. No. 60/279,414, filed Mar. 29, 2001.

FIELD OF THE INVENTION

The present invention relates to cargo conveying systems for use in moving cargo on a vehicle such as an aircraft. The present invention has particular applicability in roller drive systems in which a roller is urged upwardly against cargo to be conveyed when the system is activated and retracted when the system is deactivated.

BACKGROUND ART

Roller assemblies which are removably mounted on carriers attached to the floor of a vehicle are widely used for conveying cargo within such vehicles. These roller assemblies or "actuators" are intended for use in systems which involve the transport of commercial and military cargo containers commonly used in the air cargo, ground cargo (trucking), rail cargo and shipboard cargo industries. The actuator installs into a cargo transport vehicle, and provides motive force and holding (i.e., braking) for the containers within the vehicle.

The actuator, commonly called a power drive unit or powered drive unit (PDU), works in conjunction with external support equipment to facilitate the loading and unloading of the cargo containers into and out of the vehicle. The PDU typically incorporates a fixed frame or support base rigidly attached to the floor or floor structure of the cargo vehicle. A moving drive assembly is attached to the support base. The drive assembly includes drive roller or rollers for contacting the cargo containers and providing motive force to them by means of the frictional coefficient between an elastomeric roller surface and the container bottom, and a motor for rotating the drive roller. Cargo container bottoms are generally smooth, metallic coverings attached to a square or rectangular frame structure; however, they may also be made of non-metallic material such as wood or reinforced plastic.

The PDU also incorporates a lift mechanism which raises the drive assembly from its lowered position into abutment against the cargo container bottom, as by rotating cams on a common camshaft against reaction points or bearings in the support base. The lift mechanism provides the vertical force to the drive roller, which in turn provides the frictional force to drive the container. The lift mechanism also can be engaged to hold the container in place when the drive roller is not turning, to prevent the unintended motion of containers in the vehicle.

When drive and/or hold commands are removed from the PDU, the PDU drive assembly lowers to its retracted position. The cargo containers are typically supported by a plurality of free turning cylindrical rollers, ball transfer units or caster assemblies, which are collectively referred to as the conveyance hardware. When the PDU is retracted, the containers are free to move on the conveyance hardware, and are typically held in position during vehicle motion by latches, guides and other restraint hardware.

Typical PDUs are described in U.S. Pat. Nos. 3,690,440, 3,737,022 and 5,547,069, wherein a single motor is used to rotate an elastomeric drive roller and to power a lift mechanism which raises a drive assembly carrying the roller into abutment against a cargo container bottom. Another PDU is described in U.S. Pat. No. 5,803,234 to Podanski et al., wherein separate motors are provided for the drive and lift functions. In Podanski's PDU, the drive motor is a standard AC induction motor, and the lift motor is a brush-type DC motor.

Prior art PDU's can involve complex mechanisms which are both costly and difficult to repair or replace. However, regardless of their degree of complexity, prior art PDU's are limited in their operational flexibility under varying conditions, such as use in different vehicles or for different types of cargo containers or loading. As a result, they are not easily adaptable to different applications requiring changes in drive torque and/or lift force, and are subject to overheating and overloading due, for example, to "scrubbing" of the drive roller under parked or jammed containers.

SUMMARY OF THE INVENTION

An advantage of the present invention is a PDU whose drive and lift functions are totally independent of each other and electronically programmable, thereby enabling flexibility in setting and changing operating parameters such as vehicle interface functions, logic functions, drive torque and lift force, and enabling the inventive PDU to be adapted to be used in a variety of different vehicle applications.

According to the present invention, the foregoing and other advantages are achieved in part by an apparatus for conveying cargo comprising a support base and a drive assembly pivotably mounted to the support base for limited vertical movement substantially normal to the longitudinal axis of the support base, the drive assembly comprising a roller and a first electronically controlled electric motor for rotating the roller. A lift assembly has a second electronically controlled electric motor for moving the drive assembly relative to the support base from a retracted position substantially within the support base to an extended position with the roller in driving abutment against the cargo, and an electronic controller controls the first and second motors.

Additional advantages of the present invention will become readily apparent to those skilled in this art from the following detailed description, wherein only the preferred embodiment of the present invention is shore and described, simply by way of illustration of the best mode contemplated for carrying out the present invention. The advantages of the invention may be realized and obtained as particularly pointed out in the appended claims. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein:

FIG. 2A is a top view of the apparatus of FIG. 1.

DESCRIPTION OF THE INVENTION

Figure 1:
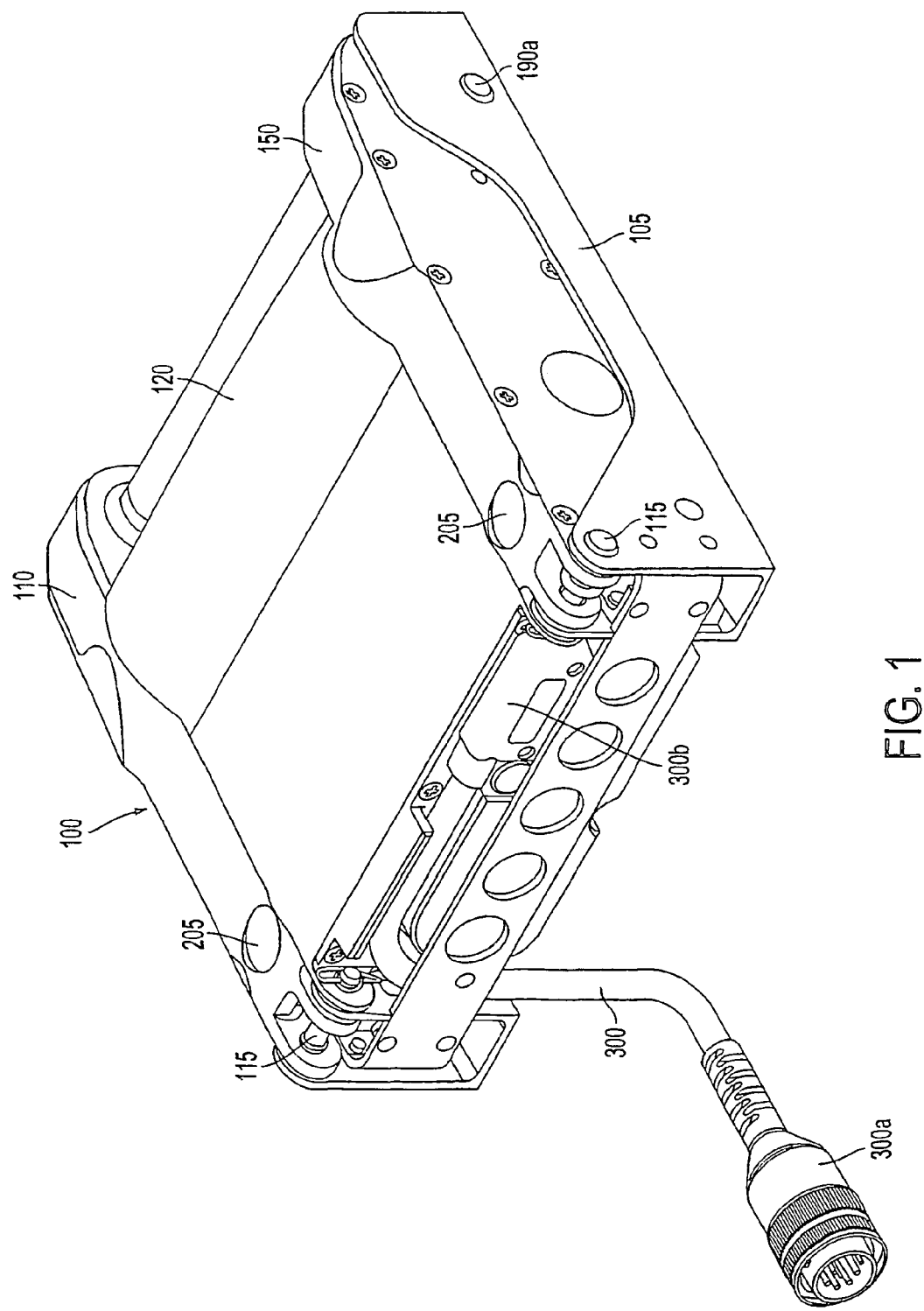
FIG. 1 is a perspective view of an apparatus in accordance with an embodiment of the present invention.
Figure 2B:
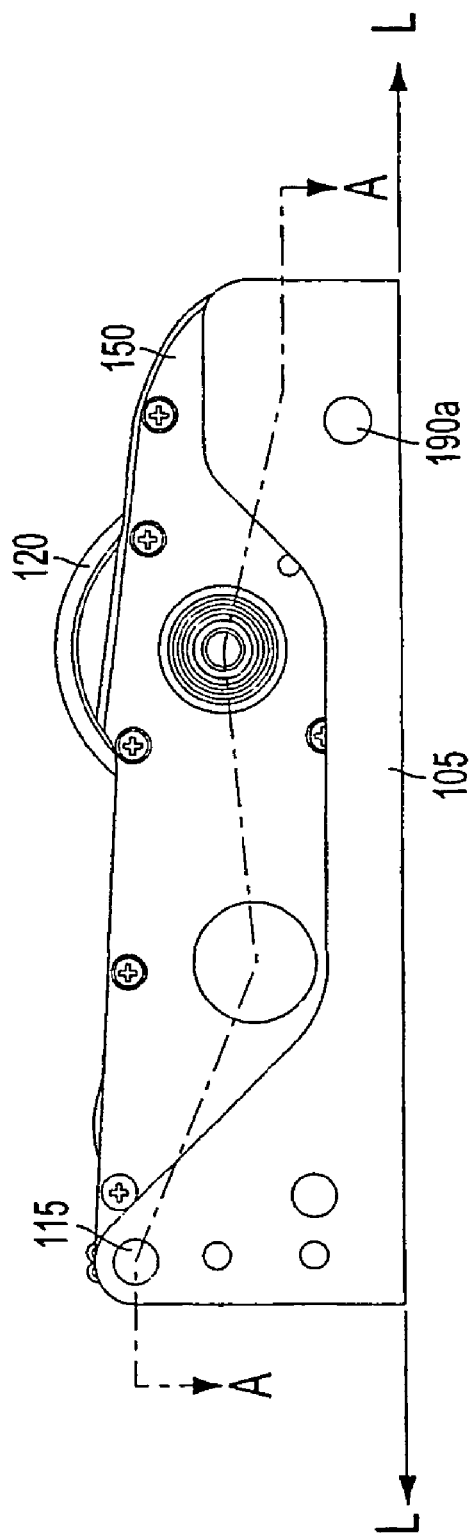
FIG. 2B is a side view of the apparatus of FIG. 1.

Conventional PDU's are mechanically complex and lack flexibility under varying operating conditions or vehicles. The present invention addresses and solves these problems of conventional PDU's.

The PDU of the present invention includes two separate electronically controlled electric motors, one for the drive function and one for the lift function. These motors can both be permanent magnet alternating current (PMAC) motors, commonly referred to as "brushless DC" motors. The motors have their own control electronics, which are integrated into the PDU's electronics module. The dual electronically controlled motor arrangement of the present invention provides independent, fully controllable power to both the drive and lift functions of the PDU. For example, the maximum drive torque and the maximum lift force of the PDU can be set and changed independently by the control software of the PDU, thereby providing maximum flexibility for using the actuator in various cargo applications. Furthermore, unlike prior art actuators, the present invention does not retract and then lift upon change of drive direction; the drive roller stays in constant contact with the container when the drive direction is reversed, thereby avoiding unwanted cargo movement when changing drive direction. Moreover, the use of electronically controlled motors in the inventive actuator improves upon the state of the art by providing increased motive force, reduced power consumption and reduced weight compared to prior art actuators.

An embodiment of the present invention will now be described with reference to FIGS. 1–4. A PDU 100 according to the present invention comprises a support base 105 of a metal such as aluminum, to which is mounted drive means, such as a drive assembly 110 pivotably mounted via pivot pins 115 for limited vertical movement substantially normal to the longitudinal axis L of support base 105. Drive assembly 110 comprises a drive roller 120 having an elastomeric outer surface, and means for rotating roller 120, such as an electronically controlled electric motor; e.g., a conventional PMAC motor 125 for rotating roller 120 via planetary gear assembly 130, pinion gear 135, idler gear 140 and output gear 145 (see FIG. 3).

Figure 3:
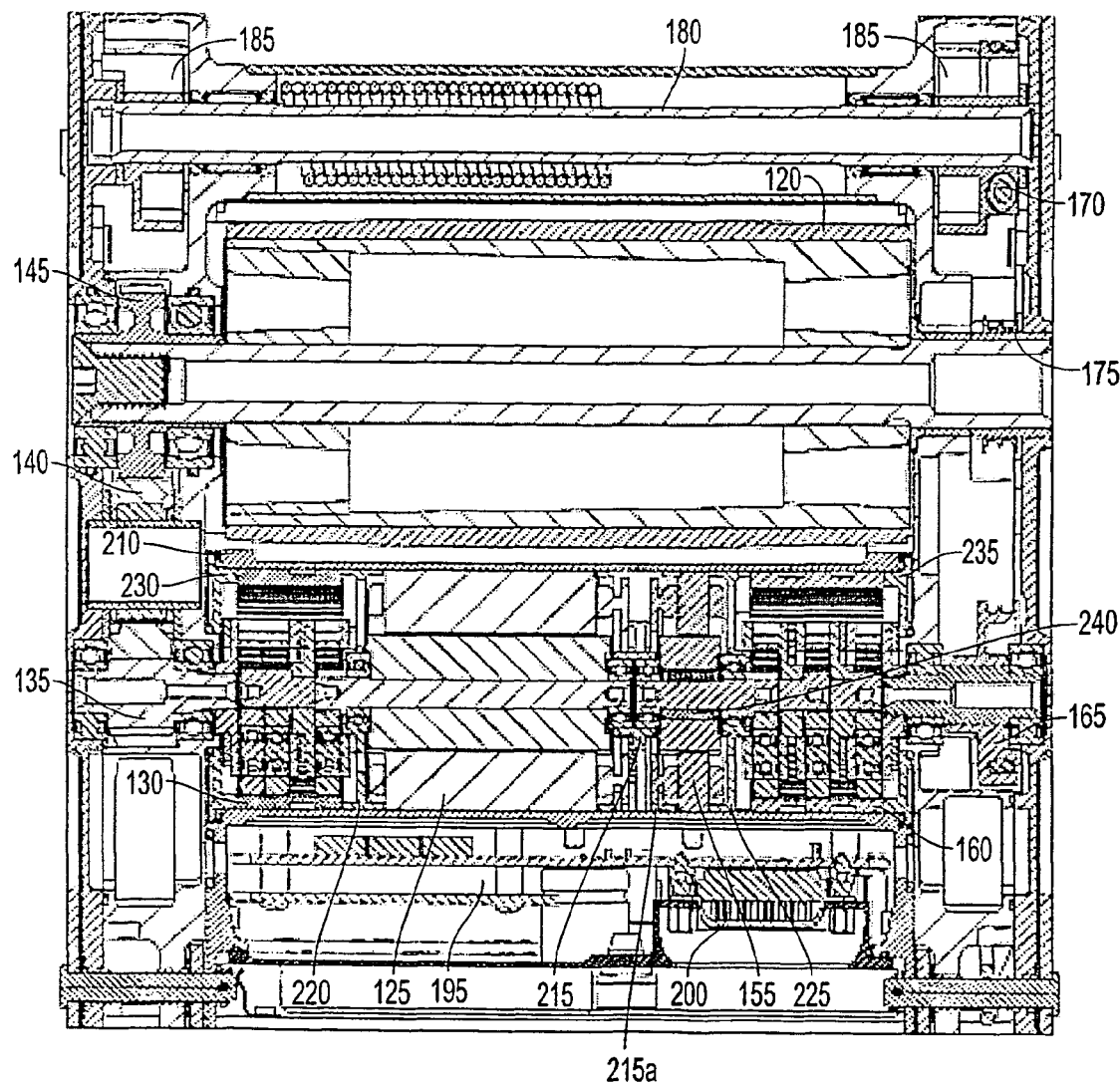
FIG. 3 is a cross-sectional view taken through line A—A of FIG. 2B.
Figure 4:
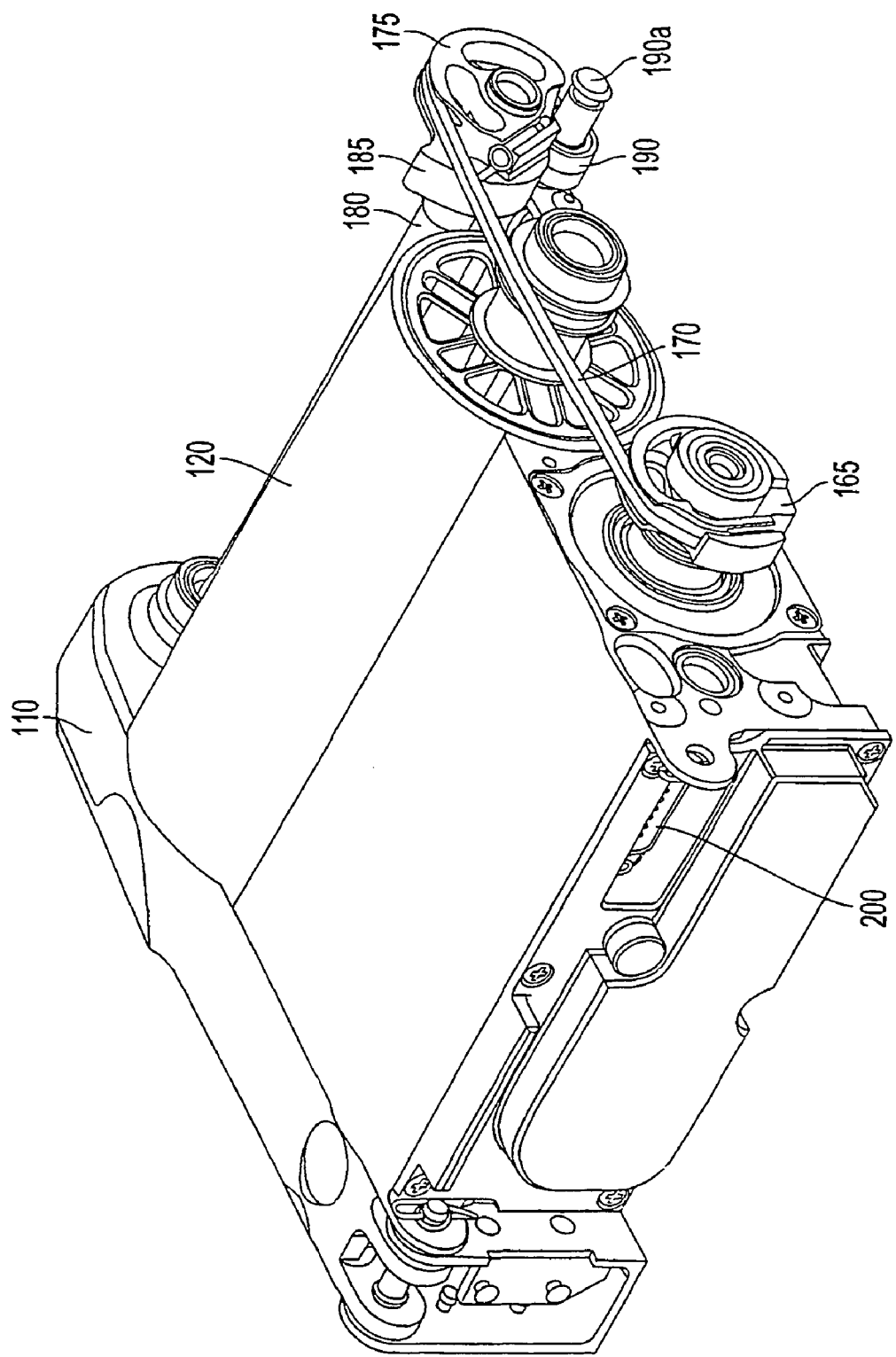
FIG. 4 is a perspective view of an apparatus in accordance with an embodiment of the present invention.

The inventive PDU also incorporates lift means, such as lift assembly 150, for raising the drive means from its lowered position, as by rotating cams on a common camshaft against reaction points or bearings in the support base. The lift means provides vertical force to the drive roller, which in turn provides the frictional force to drive the container. More specifically, lift assembly 150 comprises an electronically controlled electric motor such as a conventional PMAC motor 155. As shown in FIGS. 3 and 4, lift motor 155 transmits power through a planetary gear assembly 160, a lift cable driver 165, lift cables 170 and a lift pulley 175 to a cam shaft 180 which carries a pair of cams 185 at either end. Cams 185 react against bearings 190 supported by lift reaction pins 190a in support base 105 to move drive assembly 110 relative to support base 105 around pivot pin 115 from a retracted position substantially within support base 105 (as shown in FIGS. 1–4) to an extended position wherein roller 120 is in driving abutment against the cargo (not shown). Lift motor 155 drives at approximately 11,000 rpm as drive assembly 110 is raising, and then operates in a stalled condition when drive roller 120 comes in contact with a container bottom, or when lift assembly 150 reaches its internal lift stop (not shown).

Lift assembly 150 incorporates tension cables 170 to transmit torque from lift motor 155 and gearing 160 to lift cams 185. In prior art actuators, the common means to provide torque to lift cams is to use gearing. The layout of the present invention is designed so that drive roller 120 is located between motors 125, 155 and lift cams 185. This layout provides optimum load distribution and minimizes the loads transmitted into support base 105. Torque transmission from the lift gearing 160 to cams 185 is accomplished by one or more multi-strand, steel or composite cables or straps 170, which are pulled by driver 165 at the output of lift gearing 160, and in turn pull cams 185 at a fixed radius. Cams 185 rotates against reaction bearings 190 in support base 105, thereby providing both vertical motion and vertical force to drive roller 120. Since an independent lift motor 155 is used, lift assembly 150 is designed to rotate in a single direction, regardless of the direction of drive roller rotation. The cable lift mechanism of the present invention provides a lighter weight, lower cost solution which can be operated in an open environment, eliminating the need for the prior art's sealed gearing at the output of the lift mechanism.

PDU 100 also comprises control means for independently controlling the lift means and the means for rotating the roller, such as an electronic controller 195 for electronically controlling drive motor 125 and lift motor 155 in a conventional manner as required by all electronically controlled motors, and for performing logical, memory and other operations which will be described in detail hereinbelow. Electronic controller 195 also includes built-in-test (BIT) functions to verify the proper operation of the actuator prior to use. Electronic controller 195 includes an input/output port 200, such as a serial port, for receiving signals from an external controller (not shown) and for sending signals to the external controller or other external devices, such as a computer. Electronic controller 195 further comprises a non-volatile memory that is used to collect and retain operating information of PDU 100, such as total operating time, total operating cycles, or any other data available to electronic controller 195. This data can be extracted via input/output port 200 for purposes of tracking reliability data or verifying usage.

Electronic controller 195 performs several critical functions. It controls independent lift and drive motors 125, 155, vehicle interface and logic functions, as well as providing electromagnetic interference control. Conventional power control modules for both motors 125, 155 are incorporated into electronic controller 195, which in one embodiment of the present invention comprises 'cool' MOSFETs (metal oxide semiconductor field effect transistors) for power switching. These devices have advantageously low power dissipation, and are ideally suited to application in a PDU. Electronic controller 195 can also utilize advanced IGBTs (integrated gate bipolar transistors) for other critical switching functions. Each motor 125, 155 can be controlled by its own microprocessor within electronic controller 195 which stores software code, including the current and force limit settings for the motors, acceleration and deceleration rates, timeouts and delays, and any other necessary information. Electronic controller 195 can also include an EMI (electromagnetic interference) filter to limit both the conducted EMI from PDU 100 as well as the EMI susceptibility of PDU 100 to within industry standards.

PDU 100 further includes two separate non-contacting sensors 205 which detect the presence of cargo containers above PDU 100. Sensors 205 can be one or more of several types of non-contacting sensors, e.g. infrared, ultrasonic, Hall effect, etc. The sensor cargo presence signals are received by electronic controller 195, which operates motors 125, 155 only if it receives the cargo presence signal from at least one of the sensors 205. Electronic controller 195 applies 'OR' logic to insure that PDU 100's motors 125, 155 operate when one sensor 205 experiences a failure (ON or OFF). The dual sensors provide added protection from contamination that might block one sensor 205 and render PDU 100 inoperable. Alternatively, electronic controller 195 can receive a manual override signal from the external controller through input/output port 200, and in response will operate motors 125, 155 regardless of whether the cargo presence signal is received from sensors 205. This manual override mode is used for system check-out and for sensor fault override.

In addition to cargo sensors 205, temperature sensors 205a are provided for monitoring the temperature of motors 125, 155 and the temperature of electronic controller 195. Electronic controller 195 also monitors motor operating parameters such as electrical current draw and speed of motors 125, 155 in a conventional manner employing sensors incorporated into motors 125, 155, such as rotor position sensors, which are required for operation of motors 125, 155. Using sensors 205a and its monitoring functions, electronic controller 195 provides internal self-protection against overheating, as well as protection against both drive motor and lift motor overloads. As discussed above, electronic controller 195 can provide feedback to the external controller through input/output port 200. Such feedback signals can include but are not limited to container presence, drive motor speed, drive roller speed, drive or lift motor current or corresponding loads, thermal protection status and a PDU identifier code.

Drive and lift motors 125, 155 and their associated gearing are designed to be installed into a center housing 210 of PDU 100 comprising a single, continuous bore. Center housing 210 contains both drive and the lift motors 125, 155, planetary lift gearing 160, planetary primary drive gearing 130, inboard bearing support 215, outboard bearing supports 220, 225 and end covers 230, 235. The advantages of this configuration are the ease of manufacture of the housing bore 210, the ease of assembly of components into a common bore, and the elimination of shimming during assembly. Shimming is a time consuming and error prone step in the assembly process which is avoided in this embodiment of the present invention. Shimming is eliminated in the inventive apparatus, despite the numerous axial components in the bore, because inboard bearing support 215 not only supports the inboard bearings of the rotors of both drive and lift motors 125, 155, but also provides an axial spring 215a which compensates for the tolerance stack-up in the bore of center housing 210. The assembled components are compressed against spring 215a and are retained by end covers 230, 235 thereby eliminating gaps between all the components in the bore of center housing 210.

Lift assembly 150 also includes a one-way clutch 240 between lift motor 155 and lift gearing 160 to eliminate the impact loads which would normally occur when drive assembly 110 retracts to the lowered position. During retraction, lift motor 155 accelerates to high speed; clutch 240 allows motor 155 to 'free-wheel' to a stop after lift cams 185 contact their down direction stop (not shown).

The performance and operational availability of a PDU is directly related to the size and durability of its drive roller(s). The size of the drive roller (based on its diameter and length) relative to the overall 'footprint' or top view of the PDU is advantageously maximized to insure good contact with the container, as well as long roller life. Drive roller 120 of PDU 100 of the present invention encompasses approximately 23% of its support base 105's footprint (i.e., the length and width of support base 105), with a total surface area of approximately 48 square inches. By comparison, prior art PDUs used in air cargo have single or dual drive rollers that are about 12% to 17% of the footprint area, and total surface areas of 7 to 39 square inches.

The fixed support base of the inventive PDU 100 is designed to minimize weight and cost, yet still transfer the required loads from drive assembly 110 to the vehicle floor structure. This is accomplished by the layout and load distribution described above, which transfers the loads imparted to drive roller 120 through pivot pins 115 and lift cams 185 and into the corners of base 105 through reaction pins 190. This minimizes bending and deflection in support base 105, and allows base 105 to be manufactured with aluminum sheet stampings or thin-walled extrusions.

Several exemplary actuation functions or "modes" of PDU 100 will now be described. The "retracted mode" is the normal rest mode of PDU 100, wherein external power is removed, no drive or hold command is sent from the external controller, or no container is present (i.e., no cargo presence signal is generated by sensors 205). Retract mode facilitates the manual movement of containers. since drive assembly 110 is retracted below the conveyance plane.

In the "lift and drive mode", lift assembly 150 raises drive assembly 110 into contact with a container and drive roller 120 rotates to move the container. A direction command from the external controller and the cargo presence signal are required for this mode. Unlike typical prior art actuators having a single motor for both lifting and driving, PDU 100 does not retract and then lift upon a change of drive direction. Rather, drive roller 120 stays in constant contact with the container when the drive direction is reversed, because electronic controller 195 causes drive motor 125 to reverse direction while maintaining lift assembly 150 in the extended position.

In the "hold mode", lift assembly 150 raises drive assembly 110 into contact with a container and drive roller 120 is restrained from rotating by drive motor 125 and its associated drive gearing 135, 140, 145. The hold function of the inventive PDU 100 does not require a separate brake (e.g., a friction-type brake), because drive motor 125 is locked electronically by electronic controller 195 to prevent rotation of drive roller 120. This mode is intended to stop and hold containers in position, and can be used continuously when power is available to PDU 100. The hold mode is selectable via a command from the external controller such that the operator can choose to have PDU 100 hold or retract when the drive command is removed. For example, a pin of input/output port 200 can be connected to the vehicle ground as a signal to electronic controller 195 that the hold mode is desired. This can be applied without operator input, such as when a cargo door of an airplane is opened and the PDU system is turned on, all PDU's are placed in hold mode. The hold mode is typically maintained by the airplane's logic controllers when AC power is interrupted. For example, the hold mode can be engaged by a relay in the airplane.

Unlike prior art PDUs, the actuator of the present invention has the ability to resume the container holding mode after AC power is removed and subsequently re-applied without operator input. This is particularly important in the air cargo industry, where AC power is typically supplied by a ground power cart, aircraft generators, or an aircraft auxiliary power unit (APU), and is subject to momentary interruption and re-application at any time. Prior art PDUs can lose contact with and control of the cargo container upon power interruption, because they retract immediately upon power interruption and require a drive command to be reapplied by the operator upon resumption of AC power delivery to resume holding (since they typically have a common lift and drive motor). In contrast, PDU 100 of the present invention retracts upon interruption of AC power, but when power is reapplied, sensors 205 detect cargo above them, and electronic controller 195 sees the hold signal, because the hold mode was engaged by the aircraft controller prior to power interruption, as discussed immediately above. In response to the cargo presence signal and the hold signal, electronic controller 195 automatically causes lift assembly 150 to move from the retracted to the extended position and drive assembly 110 to hold the cargo in place. A drive signal from the operator is not necessary.

In a further embodiment of the present invention, PDU 100 incorporates a traction and scrubbing control function, featuring sensors and logic which limit unnecessary scrubbing of the drive roller under parked or jammed containers, thereby avoiding excessive drive roller wear and motor overheating. When a container reaches its intended position against a latch or another container, it is said to be parked. Most prior art PDUs will continue to drive against a parked container until the drive command is removed, or until the PDU overheats. Some PDUs have incorporated 'time-outs' or container motion sensors to limit scrubbing under parked containers. However, time-outs do not allow the operator the flexibility to work with various sizes of containers, and motion sensors may not work well under wet or slow moving containers.

Electronic controller 195 of PDU 100 of the present invention analyzes the amount of torque applied to drive roller 120 (which is proportional to drive motor 125's current draw) and the motor 125's run time to determine the instantaneous power consumption of drive motor 125. More particularly, electronic controller 195 includes conventional circuitry for measuring the electrical current draw of drive motor 125 and for monitoring the measured current draw. Electronic controller 195 compares a power consumption curve stored in its memory to the monitored current draw, and shuts off drive motor 125 when its power consumption exceeds this curve. Under high traction loads, the drive time is limited to reduce drive roller scrubbing. Under lighter loads, as are encountered with lightweight or wet containers, drive motor 125 runs as long as the drive command is applied. This logic reduces the likelihood of 'false trips', and lets drive motor 125 run long enough to 'squeegee' a wet drive roller and move wet containers.

In one embodiment of the present invention, scrubbing (i.e., controlled roller wear) is accomplished by turning off drive motor 125 when the accumulated energy delivered to drive roller 120 via drive motor 125 exceeds a preset limit. The accumulated energy ($E_{accumulated}$) is calculated by summing the total dissipated energy ($E_{dis}$) sampled over time. Dissipated energy is energy ($E_{in}$) that is being delivered to motor 125 in excess of a predetermined threshold energy value ($E_{th}$). Threshold and accumulated energy are programmable into electronic controller 195 for each PDU application and are governed by the following equations:

$$E_{in} = \int P_{in} dt = \int (I_s^2 * R_m) dt \qquad (1)$$

$$E_{th} \int P_{th} dt = \int (I_{th}^2 * R_m) dt \qquad (2)$$

$$E_{dis} = E_{in} - E_{th} \qquad (3)$$

$$E_{accumulated} = \Sigma E_{dis} dn \qquad (4)$$

where:
$R_m$=Motor resistance, normalized=1
$I_s$=Sampled current
$P_{in}$=Power into motor 125
$I_{th}$=Threshold value determined for each application
$P_{th}$=Threshold power.

Figure 5A:
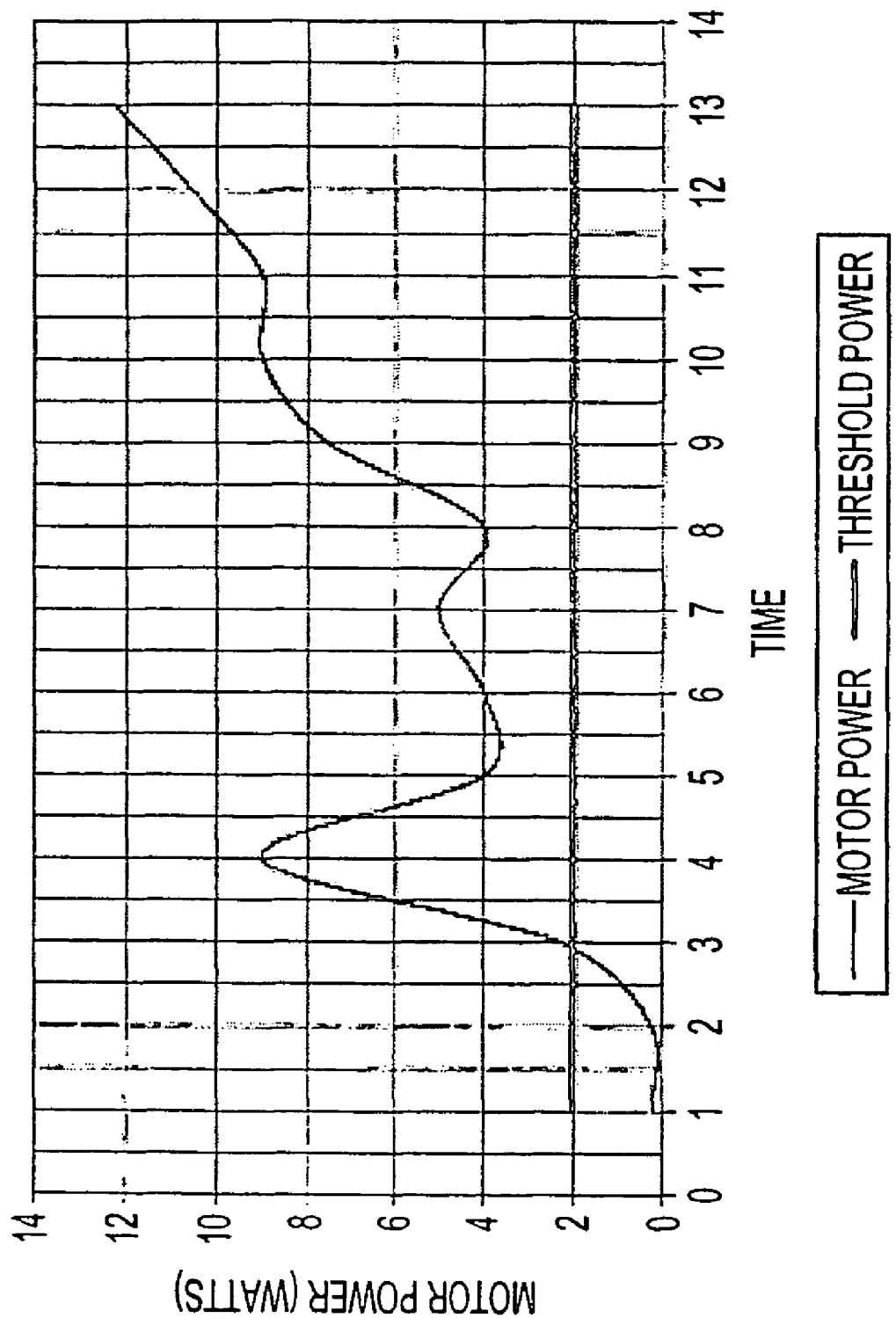
FIGS. 5A and 5B are graphical representations of a power consumption curve used in an embodiment of the present invention.
Figure 5B:
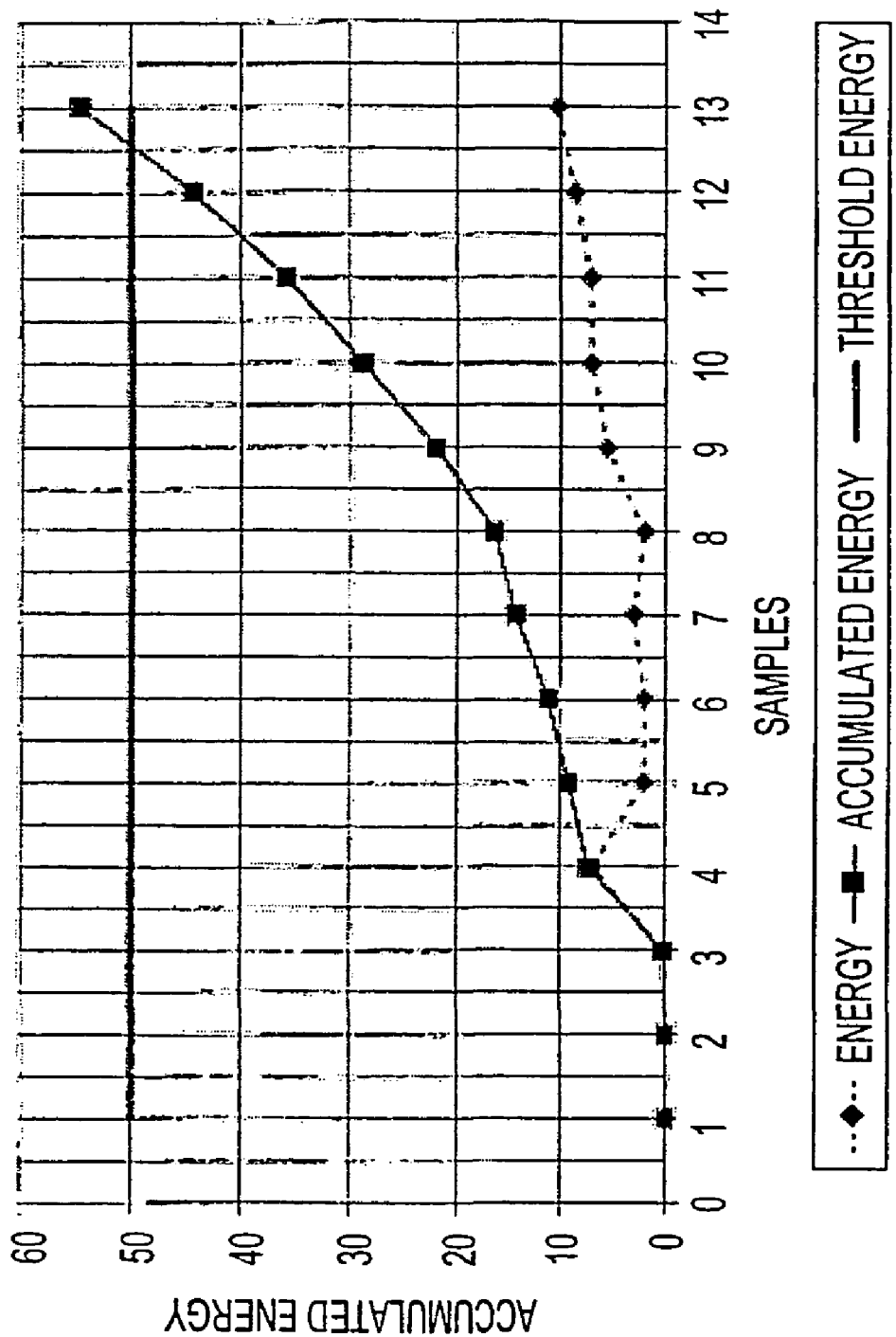

Sample power consumption curves are depicted in FIGS. 5A and 5B. FIG. 5A shows PDU energy usage with a variable load at drive roller 120, and FIG. 5B shows accumulated energy with a variable load at drive roller 120.

The PDU of the present invention is designed to operate in a number of different vehicle applications, with no changes to the actuator. It can be pre-programmed to work in several applications where a different traction forces, lift forces or logic delays are required. Electronic controller 195 has sufficient memory to store multiple programs for multiple PDU applications. As discussed above, feedback signals can also be provided to an external controller. Any one of a plurality of different external controllers can be used with a single inventive PDU by using different electrical interface cables, such as cable 300 shown in FIG. 1. The interface cables attach to input/output port 200 but have a distinct vehicle interface connector, such as connector 300a, based on the controller application. Circuitry internal to the particular electrical interface cable, such as circuitry 300b, identifies the cable type to electronic controller 195 via input/output port 200, and in response electronic controller 195 selects and uses software specific to that application stored in its memory. Thus, the same PDU 100 can be installed in a different position or a different vehicle type, and work properly without any changes to the unit.

The inventive PDU features two separate permanent magnet brushless DC electric motors, one for the drive function and one for the lift function. The motors have their own control electronics, which are integrated into a PDU electronics module. The drive motor is current limited to control the maximum available drive torque, which can be varied for different cargo applications along with the maximum lift force of the PDU, via control software. The dual motor arrangement provides independent, fully controllable operation of both the drive and lift functions of the PDU of the present invention. This independence and programmability provides maximum flexibility for using the inventive PDU in various applications.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail in order not to unnecessarily obscure the present invention.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. An apparatus for conveying cargo, the apparatus comprising:
   a support base;
   a drive assembly pivotably mounted to the support base for limited vertical movement substantially normal to the longitudinal axis of the support base, the drive assembly comprising a roller and a first electronically controlled electric motor for rotating the roller;
   a lift assembly comprising a second electronically controlled electric motor disposed in the drive assembly for moving the drive assembly relative to the support base from a retracted position substantially within the support base to an extended position with the roller in driving abutment against the cargo; and
   an electronic controller for controlling the first and second motors.

2. The apparatus of claim 1, comprising a sensor for detecting the presence of the cargo above the drive assembly and sending a cargo presence signal to the electronic controller.

3. The apparatus of claim 2, wherein the electronic controller is for operating the motors only if it receives the cargo presence signal.

4. The apparatus of claim 1, comprising at least two sensors, each for detecting the presence of the cargo above the drive assembly and respectively sending a cargo presence signal to the electronic controller, wherein the electronic controller is for operating the motors only if it receives the cargo presence signal from at least one of the sensors.

5. The apparatus of claim 3, comprising an input device for sending a manual override signal from a user to the electronic controller, wherein the electronic controller is for operating the motors when it receives the manual override signal and does not process the cargo presence signal.

6. The apparatus of claim 4, comprising an input device for sending a manual override signal from a user to the electronic controller, wherein the electronic controller is for operating the motors when it receives the manual override signal and does not receive the cargo presence signal.

7. The apparatus of claim 2, wherein the sensor comprises a non-contacting sensor.

8. The apparatus of claim 7, wherein the sensor comprises a Hall effect sensor, an infrared sensor, or an ultrasonic sensor.

9. The apparatus of claim 1, wherein the lift assembly comprises a cam rotatably mounted in the drive assembly and rotated by the second motor for reaction against a bearing in the support base to provide the vertical movement to the drive assembly;
   wherein the drive roller is disposed between the second motor and the cam.

10. The apparatus of claim 9, wherein the bearing in the support base is supported by a pin disposed proximal to a corner of the support base.

11. The apparatus of claim 10, wherein the support base comprises aluminum.

12. The apparatus of claim 9, wherein the lift assembly further comprises a flexible tension cable connected to the second motor and the cam for transmitting torque from the second motor to the cam.

13. The apparatus of claim 12, wherein the flexible tension cable comprises a multi-strand steel cable.

14. The apparatus of claim 12, wherein the flexible tension cable comprises a composite cable or strap.

15. The apparatus of claim 1, wherein the electronic controller is for controlling the first motor to rotate the roller in a first direction or in a second direction opposite the first direction;
   wherein when the lift assembly is in the extended position and the roller is rotating in the first direction, the electronic controller is for causing the first motor to rotate the roller in the second direction while maintaining the lift assembly in the extended position.

16. The apparatus of claim 2, wherein the electronic controller is for receiving a hold signal from an external controller; and
   wherein the electronic controller is for causing the lift assembly to move from the retracted position to the extended position, and the first motor to hold the roller stationary, when the electronic controller receives the hold signal and the cargo presence signal.

17. The apparatus of claim 1, comprising a circuit for measuring electrical current draw to the first motor, wherein the electronic controller is for monitoring the current draw of the first motor, and for removing power from the first motor when the current draw of the first motor exceeds a predetermined current draw for a predetermined time period.

18. The apparatus of claim 17, wherein the electronic controller comprises a memory for storing a power consumption curve representing a plurality of current draw values and corresponding time periods, and the electronic controller is for calculating the predetermined current draw and predetermined time period based on the power consumption curve.

19. The apparatus of claim 18, wherein the power consumption curve is for limiting the time of operation of the first motor to reduce scrubbing of the roller against the cargo.

20. The apparatus of claim 1, wherein the drive assembly comprises a continuous bore, and the first and second motors are mounted coaxially inside the bore.

21. The apparatus of claim 20, wherein the first and second motors each comprise a shaft and an inboard bearing for supporting the shaft; and
   wherein the drive assembly further comprises an inboard bearing support for commonly supporting the inboard bearings of the first and second motors inside the bore.

22. The apparatus of claim 21, wherein the inboard bearing support comprises an axial spring for compensating for tolerance in the bore.

23. The apparatus of claim 21, further comprising primary drive gearing attached to the first motor shaft and lift gearing attached to the second motor shaft, wherein the bore is for housing the primary drive gearing and lift gearing.

24. The apparatus of claim 1, wherein the apparatus has a footprint defined by the length and width of the support base, and the roller has a footprint defined by the diameter and length of the roller, wherein the footprint of the roller is greater than 20 percent of the footprint of the apparatus.

25. The apparatus of claim 24, wherein the footprint of the roller is about 23 percent of the footprint of the apparatus.

26. The apparatus of claim 16, wherein the electronic controller comprises an input/output port;
   wherein the apparatus is controllable by the external controller via the input/output port; and
   wherein the electronic controller is for sending feedback signals to the external controller, the feedback signals including at least one of an identifier code for the apparatus, the cargo presence signal, a first motor speed signal, a roller speed signal, a first motor load signal, a second motor load signal, and a thermal protection status signal.

27. The apparatus of claim 1, wherein the electronic controller comprises a non-volatile memory for storing operating information relating to the apparatus.

28. The apparatus of claim 27, wherein the operating information includes at least one of total operating time of the apparatus and total operating cycles.

29. The apparatus of claim 27, wherein the electronic controller comprises an input/output port for downloading information from the non-volatile memory to an external computer.

30. The apparatus of claim 1, wherein the electronic controller is for providing control, programmable by a user, of at least one of first motor traction force, second motor lift force, first and second motor speed, logic functions and electromagnetic interference control.

31. The apparatus of claim 1, comprising first and second motor temperature sensors, each for sending a respective motor temperature signal to the electronic controller.

32. The apparatus of claim 1, comprising:
an input/output port of the electronic controller; and
an interface cable for connecting to the input/output port and to one of a plurality of different external controllers for controlling the apparatus, the interface cable having circuitry for identifying the one external controller to the electronic controller;
wherein the electronic controller is for selecting and using software specific to the one external controller responsive to the cable circuitry.

33. The apparatus of claim 12, wherein the second motor is for moving the drive assembly from the extended position to the retracted position, and the lift assembly comprises a one-way clutch between the second motor and the flexible tension cable for allowing the second motor to free-wheel after the second motor moves the drive assembly from the extended position to the retracted position.

34. An apparatus for conveying cargo, the apparatus comprising:
a support base;
drive means mounted to the support base for limited vertical movement substantially normal to the longitudinal axis of the support base, the drive means comprising a roller;
means for rotating the roller;
lift means disposed in the drive means for moving the drive means relative to the support base from a retracted position substantially within the support base to an extended position with the roller in driving abutment against the cargo; and
control means for independently electronically controlling the lift means and the means for rotating the roller.

35. A method of conveying cargo, the method comprising:
mounting a drive assembly having a roller for limited vertical movement substantially normal to the longitudinal axis of a support base;
providing a first electronically controlled electric motor for rotating the roller;
moving the drive assembly relative to the support base from a retracted position substantially within the support base to an extended position with the roller in driving abutment against the cargo;
providing a second electronically controlled electric motor in the drive assembly for moving the drive assembly; and
electronically controlling the first and second motors.

36. The method of claim 35, comprising detecting the presence of the cargo above the drive assembly and operating the motors only if the cargo is detected.

37. The method of claim 35, comprising:
providing at least two sensors, each for detecting the presence of the cargo above the drive assembly; and
operating the motors only if cargo is detected by at least one of the sensors.

38. The method of claim 37, comprising sending a manual override signal from a user; and
operating the motors when the manual override signal is sent and cargo presence is not detected.

39. The method of claim 35, comprising controlling the first motor to rotate the roller in a first direction or in a second direction opposite the first direction; and
causing the first motor to rotate the roller in the second direction while maintaining the drive assembly in the extended position when the drive assembly is in the extended position and the roller is rotating in the first direction.

40. The method of claim 36, comprising:
receiving a hold signal from an external controller; and
causing the drive assembly to move from the retracted position to the extended position, and the first motor to hold the roller stationary when the hold signal is received and cargo is detected.

41. The method of claim 35, comprising:
measuring electrical current draw to the first motor;
monitoring the current draw of the first motor; and
removing power from the first motor when the current draw of the first motor exceeds a predetermined current draw for a predetermined time period.

42. The method of claim 41, comprising storing a power consumption curve representing a plurality of current draw values and corresponding time periods, and calculating the predetermined current draw and predetermined time period based on the power consumption curve.

43. The method of claim 42, wherein the power consumption curve is for limiting the time of operation of the first motor to reduce scrubbing of the roller against the cargo.

44. The method of claim 35, comprising sending feedback signals to an external controller, the feedback signals including at least one of an identifier code for the apparatus, the cargo presence signal, a first motor speed signal, a roller speed signal, a first motor load signal, a second motor load signal, and a thermal protection status signal.

45. The method of claim 35, comprising providing control, programmable by a user, of at least one of first motor traction force, second motor lift force, first and second motor speed, logic functions and electromagnetic interference control.

46. The apparatus of claim 1, wherein the first and second motors are permanent magnet alternating current motors.

* * * * *